(12) United States Patent
Miranda et al.

(10) Patent No.: US 11,669,627 B1
(45) Date of Patent: Jun. 6, 2023

(54) SYSTEM FOR DATA ACCESS TOKEN MANAGEMENT

(71) Applicant: Wells Fargo Bank, N.A., San Francisco, CA (US)

(72) Inventors: Darius A. Miranda, San Francisco, CA (US); Rajiv Ranjan, Fremont, CA (US); Uma Meyyappan, Freemont, CA (US); Chris Theodore Kalaboukis, San Jose, CA (US); Joon Maeng, Newcastle, WA (US); Ramanathan Ramanathan, Bellevue, WA (US); Abhijit Rao, Irvine, CA (US); Abhijit Shetti, Pleasanton, CA (US); Rameshchandra Bhaskar Ketharaju, Hyderabad (IN); Chandramouli Subramanian, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 270 days.

(21) Appl. No.: 16/949,072

(22) Filed: Oct. 13, 2020

(51) Int. Cl.
*G06F 21/62* (2013.01)
*G06F 9/451* (2018.01)
(Continued)

(52) U.S. Cl.
CPC .......... *G06F 21/6218* (2013.01); *G06F 9/451* (2018.02); *G06F 21/31* (2013.01);
(Continued)

(58) Field of Classification Search
CPC ........... H04L 2463/121; H04L 63/0272; H04L 63/0428; H04L 63/0807; H04L 63/107;
(Continued)

(56) References Cited

U.S. PATENT DOCUMENTS 5,006,998 A * 4/1991 Yasunobu .............. G06Q 40/06
706/46
8,327,450 B2 * 12/2012 Clement .................. G07C 9/27
713/189

(Continued)

FOREIGN PATENT DOCUMENTS

| CN | 108881160 A | 11/2018 |
| CN | 109697337 A | 4/2019 |
| WO | WO-2013050837 A1 | 4/2013 |

OTHER PUBLICATIONS

Bertram, Sabine, et al., "A privacy-preserving system for data ownership using blockchain and distributed databases", arXiv:1810.11655v1 [cs.CR] 27, (Oct. 27, 2018), 8 pgs.

(Continued)

*Primary Examiner* — Gary S Gracia
(74) *Attorney, Agent, or Firm* — Schwegman Lundberg & Woessner, P.A.

(57) ABSTRACT

A method may include, receiving, at a server device and from a requesting computing device associated with a requesting user, a request for a data item. The data item configured may be configured as a data structure and include an encrypted data payload; metadata identifying a source of the payload and when the data payload was captured; and a token identifying an owner of the data item and access rights to the data item. The method may include parsing he token to identify the owner of the data item; transmitting the request for the data item to a computing device associated with the owner; receiving a response from the computing device. The response may indicate the requesting user may access the data item, and in response, transmit a decryption key to the requesting computing device for the encrypted data payload. The method may include updating the token.

18 Claims, 5 Drawing Sheets

(51) Int. Cl.
*G06F 21/60* (2013.01)
*G06F 21/78* (2013.01)
*G06F 21/31* (2013.01)

(52) U.S. Cl.
CPC ............ *G06F 21/602* (2013.01); *G06F 21/78* (2013.01); *G06F 2221/0711* (2013.01); *G06F 2221/2141* (2013.01); *G06F 2221/2145* (2013.01)

(58) Field of Classification Search
CPC ... H04L 63/108; H04L 9/3213; H04L 9/3297; H04W 4/02
See application file for complete search history.

(56) References Cited

U.S. PATENT DOCUMENTS

| | | | | |
|---|---|---|---|---|
| 8,516,090 | B1* | 8/2013 | Welch | G06F 21/10 709/221 |
| 8,881,304 | B2* | 11/2014 | Vrielink | H04L 63/10 726/28 |
| 10,068,098 | B2 | 9/2018 | Embleton | |
| 10,152,744 | B2 | 12/2018 | Fisher | |
| 10,225,258 | B2* | 3/2019 | Camenisch | H04L 63/126 |
| 10,402,793 | B2 | 9/2019 | Haldenby et al. | |
| 10,410,209 | B2 | 9/2019 | Boyle et al. | |
| 11,430,487 | B2* | 8/2022 | Yoshikawa | G11B 27/327 |
| 11,468,413 | B1* | 10/2022 | Kurani | G06Q 20/3829 |
| 11,539,523 | B1* | 12/2022 | Miranda | H04L 9/3213 |
| 2013/0268552 | A1 | 10/2013 | Platt et al. | |
| 2014/0033278 | A1* | 1/2014 | Nimashakavi | H04L 63/10 726/4 |
| 2016/0110562 | A1* | 4/2016 | Dravneek | G06Q 10/10 726/1 |
| 2016/0269416 | A1* | 9/2016 | Camenisch | H04L 63/126 |
| 2017/0046664 | A1 | 2/2017 | Haldenby et al. | |
| 2017/0052522 | A1* | 2/2017 | Klein | H04L 63/10 |
| 2017/0351871 | A1 | 12/2017 | Christiansen | |
| 2018/0182052 | A1* | 6/2018 | Panagos | G06Q 20/308 |
| 2018/0225630 | A1* | 8/2018 | Creager | G06Q 10/10 |
| 2019/0080407 | A1 | 3/2019 | Molinari et al. | |
| 2019/0097812 | A1* | 3/2019 | Toth | H04L 9/0841 |
| 2019/0130483 | A1 | 5/2019 | De Jong | |
| 2019/0266577 | A1 | 8/2019 | Baldet et al. | |
| 2019/0266601 | A1 | 8/2019 | Allen | |
| 2019/0311352 | A1 | 10/2019 | Lui et al. | |
| 2020/0052896 | A1* | 2/2020 | Acharya | H04L 9/3213 |
| 2020/0137440 | A1* | 4/2020 | Zavesky | H04N 21/23418 |
| 2020/0151303 | A1* | 5/2020 | Chandler | G06Q 50/184 |
| 2020/0162246 | A1* | 5/2020 | Schouppe | H04L 9/0637 |
| 2021/0035140 | A1* | 2/2021 | Fuzayloff | G06F 40/40 |
| 2022/0071547 | A1* | 3/2022 | Revels | G16H 20/70 |
| 2022/0407702 | A1* | 12/2022 | Jakobsson | H04L 9/50 |

OTHER PUBLICATIONS

Guo, Hao, et al., "Multi-Authority Attribute-Based Access Control with Smart Contract", ICBT. arXiv:1903.07009v4 [cs.CR], [Online], Retrieved from the Internet: <URL: https://arxiv.org/abs/1903.07009>, (Sep. 2019), 6 pgs.

Norta, Alex, et al., "A Privacy-Protecting Data-Exchange Wallet with Ownership- and Monetization Capabilities", 2018 International Joint Conference on Neural Networks (IJCNN), [Online]. Retrieved from the Internet: <URL: https://ieeexplore.ieee.org/abstract/document/8489551>, (Jul. 2018), 8 pgs.

* cited by examiner

SYSTEM FOR DATA ACCESS TOKEN MANAGEMENT

BACKGROUND

People are constantly, implicitly, or explicitly, generating data based on their actions on computing devices (e.g., mobile phones, laptops, etc.). For example, websites often use tracking cookies that identify what websites a user visits, how often they visit, etc. In other instances, applications may monitor the likes and dislikes based on user inputs or frequency of play of certain digital media (e.g., videos, music) to personalize the application to the user. Regardless of how the information is collected, the data warehouses may collate the data and offer it to other service providers. These service providers may use the data to target the user should that user end up on their website, present personal offers to the users, etc. In many instances, the user has limited control of their data.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have a default values should a specific value not be described. User interfaces may be provided for an end-user or administrator to edit the variable values in some instances.

As indicated above, one problem with the data that is collected about users is the lack of control. This control may mean that an owner of the data may not be able to track who can use the data, how long the data may be used, control the value of the data, among other deficiencies. There are numerous technical challenges of controlling data when the data originates in digital form and is the result of actions taken on digital devices. Similarly, there are technical solutions that do not have applicability to information about a user that is not digital (e.g., demographic information).

For example, a user's age is a user characteristic that was, and is, generally readily discoverable even before the digital age. There is no mechanism for a person to digitally encrypt their age such that it remains a secret. In contrast, when the data originates on a digital device (or based on actions therefrom) the information may immediately be encrypted such that no one may access it without a decryption key. Similarly, the data may have metadata attached to it that may control who is the owner, who can access the data, etc.

In view of the above, this document describes a data management scheme that enables collection, access, and inheritance of digital data associated with a subject user. To this end, a data structure is described for a data item that includes—in various examples—an encrypted data payload; metadata identifying the source of the payload and when the data payload was captured; and a token identifying an owner of the data item and access rights to the data item. Various entities may interact with the data item. For example, there may be data generators, data brokers, and data consumers. Further details of the data structures and entities are described in the context of the figures.

Figure 1:
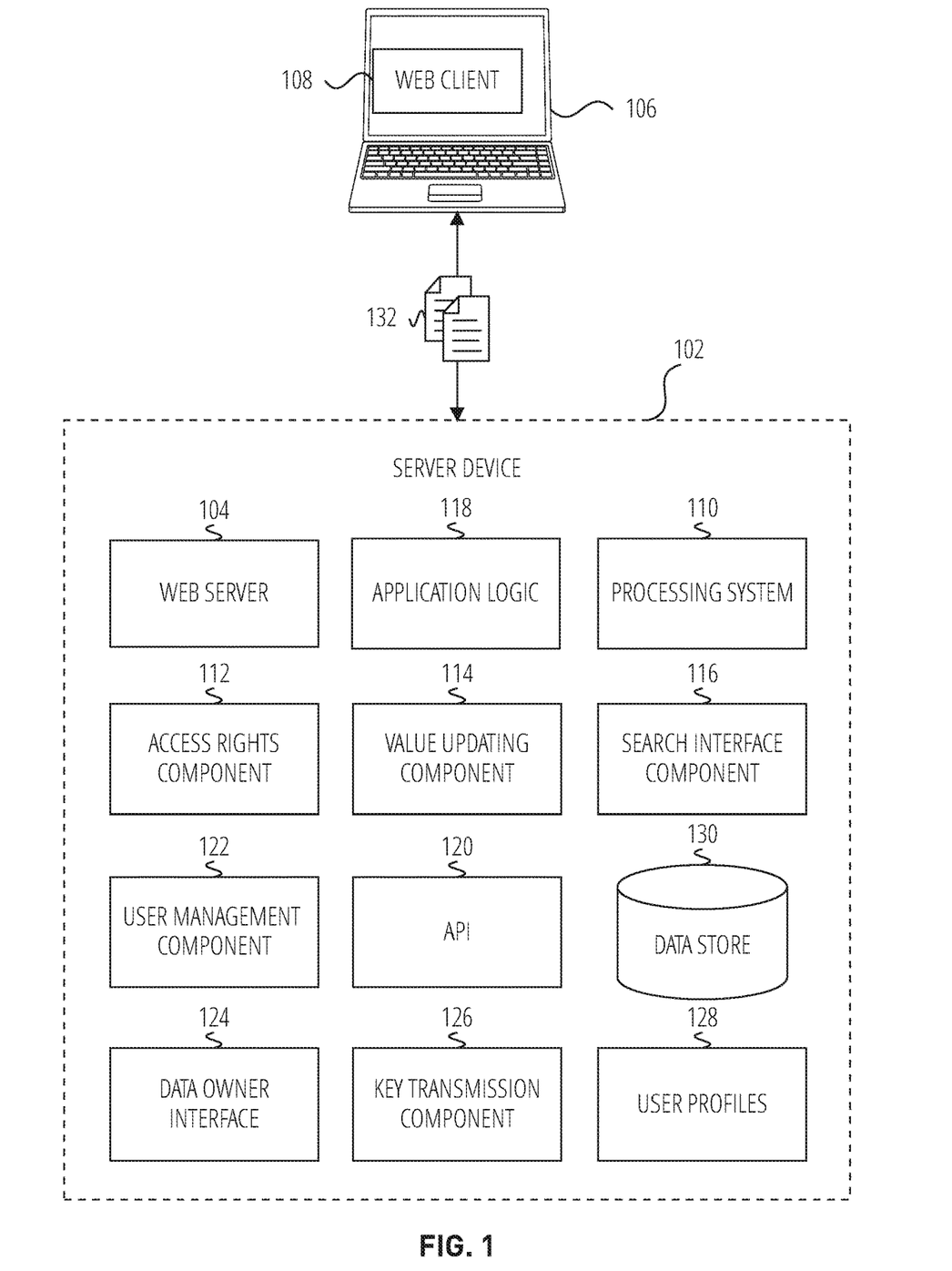
FIG. 1 is an illustration of components of a client device and an application server, according to various examples.

FIG. 1 is an illustration of components of a client device and server device according to various examples. FIG. 1 comprises a server device 102, web server 104, client device 106, web client 108, processing system 110, access rights component 112, value updating component 114, search interface component 116, application logic 118, application programming interface (API) 120, user management component 122, data owner interface 124, key transmission component 126, data store 130, and data 132.

Client device 106 may be a computing device which may be, but is not limited to, a smartphone, tablet, laptop, multi-processor system; microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device. Client device 106 may be associated with one or more entities that interact with server device 102. An entity may be an individual, group of individuals, or company in various examples.

Client device 106 and Server device 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

Client device 106 and server device 102 may communicate data 132 over the network. Data 132 may be, but is not limited to, search requests, search results, data item (as discussed in more detail below) requests, data items, decryptions keys, and data inheritance details.

In some examples, the communication may occur using an application programming interface (API) such as API 120. An API provides a method for computing processes to exchange data. A web-based API (e.g., API 120) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 130).

APIs may also be defined in frameworks provided by an operating system (OS) to access data in an application that an application may not regularly be permitted to access. For example, the OS may define an API call to obtain the current location of a mobile device the OS is installed on. In another example, an application provider may use an API call to request a user be authenticated using a biometric sensor on the mobile device. This may allow the user to access information stored in a data item. By segregating any underlying biometric data—e.g., by using a secure element—the risk of unauthorized transmission of the biometric data may be lowered.

Server device 102 is illustrated as set of separate elements (e.g., component, logic, etc.). However, the functionality of individual elements may be performed by a single element. An element may represent computer program code that is executable by processing system 110. The program code may be stored on a storage device (e.g., data store 130) and loaded into a memory of the processing system 110 for execution. Portions of the program code may be executed in a parallel across multiple processing units (e.g., a core of a general-purpose computer processor, a graphical processing unit, an application specific integrated circuit, etc.) of processing system 110. Execution of the code may be performed on a single device or distributed across multiple devices. In some example, the program code may be executed on a cloud platform (e.g., MICROSOFT AZURE® and AMAZON EC2®) using shared computing infrastructure.

Server device 102 may include web server 104 to enable data exchanges with client device 106 via web client 108. Although generally discussed in the context of delivering webpages via the Hypertext Transfer Protocol (HTTP), other network protocols may be utilized by web server 104 (e.g., File Transfer Protocol, Telnet, Secure Shell, etc.). A user may enter in a uniform resource identifier (URI) into web client 108 (e.g., the INTERNET EXPLORER® web browser by Microsoft Corporation or SAFARI® web browser by Apple Inc.) that corresponds to the logical location (e.g., an Internet Protocol address) of web server 104. In response, web server 104 may transmit a web page that is rendered on a display device of a client device (e.g., a mobile phone, desktop computer, etc.).

Additionally, web server 104 may enable a user to interact with one or more web applications provided in a transmitted web page. A web application may provide user interface (UI) components that are rendered on a display device of client device 106. The user may interact (e.g., select, move, enter text into) with the UI components, and based on the interaction, the web application may update one or more portions of the web page. A web application may be executed in whole, or in part, locally on client device 106. The web application may populate the UI components with data from external sources or internal sources (e.g., data store 130) in various examples.

For example, server device 102 may provide a web application (e.g., search interface component 116) to a user to search the metadata of a data store of data items (e.g., data store 130). For example, an input box may be presented that receives text entered by a user. The text may be formatted as a database query (e.g., SQL) and issued to a database to retrieve data items that have data in fields that match the text entered by the user. A web application (e.g., data owner interface 124 and access rights component 112) may also provide user interfaces for owner users to edit access rights, etc., of their data items. For example, user interface elements may be presented to add or revoke access rights to a data item's payload.

The interface may also allow a user to group data items based on features in the metadata (e.g., type, data source., etc). For example, the user may submit a search query to retrieve all data items that correspond to user preferences on movies. The interface may include an option to select one or more of the results and create a group of the selected results. Data store 130 may store an indication that the selected data items are part of the same group in various examples. The web application may also allow editing access rights of a group instead of requiring the user to individually edit each data item.

The web application may be executed according to application logic 118. Application logic 118 may use the various elements of server device 102 to implement the web application. For example, application logic 118 may issue API calls to retrieve or store data from data store 130 and transmit it for display on client device 106. Similarly, data entered by a user into a UI component may be transmitted using API 120 back to the web server 104. Application logic 118 may use other elements (e.g., access rights component 112, value updating component 114, search interface component 116, application logic 118, etc.) of server device 102 to perform functionality associated with the web application as described further herein.

Data store 130 may store data that is used by server device 102 (e.g., user profiles 128, data items, decryption keys, etc.). Data store 130 is depicted as singular element but may in actuality be multiple data stores. The specific storage layout and model used in by data store 130 may take a number of forms—indeed, a data store 130 may utilize multiple models. Data store 130 may be, but is not limited to, a relational database (e.g., SQL), non-relational database (NoSQL) a flat file database, object model, document details model, graph database, shared ledger (e.g., blockchain), or a file system hierarchy. Data store 130 may store data on one or more storage devices (e.g., a hard disk, random access memory (RAM), etc.). The storage devices may be in standalone arrays, part of one or more servers, and may be located in one or more geographic areas.

User profiles 128 may store the profiles of users that interact with server device 102. A user profile may include a user identifier (e.g., a username) and a password. A user profile may also include a role of the user. A user may have multiple roles. Roles may include an owner role, a buyer role (e.g., those looking to purchase access to data items), a data aggregator role (e.g., data item providers), among others. When a user logs into server device 102 (e.g., via web server 104) functionality related to the roles of the user may be provided. For example, in a buyer role, server device 102 may present a search interface to find data items for purchase. In an owner role, server device 102 may present a user interface to edit the access rights of the user's data items.

Value updating component 114 may generate or update values of data items. A data item may have an initial value determined in a number of ways. For example, an owner user may enter in some value (e.g., a quantitative value such as $0.50 or qualitative value such as high, medium, etc.) for their data items. If the owner does not enter in a value, server device 102 may assign the data item a value based on its metadata. For example, a weighted calculation may be made that uses when the data item was generated (recent data is given a higher value, etc.), the type of data (e.g., location data has one default value, user preference has a default value), etc. In some examples, the calculated value may be presented to the owner for confirmation before being stored as part of the data item.

Periodically, value updating component 114 may iterate through one or more data items stored in data store 130 and update the values of the data item. For example, a formula—e.g., similar or identical to the weighted calculation above—may be stored that calculates a value for the data item based on the metadata of the data item. In other examples, an adjustment calculation may be used that decreases or increases the value based on a change in one or more of the metadata fields or a change in a subject user of the data item.

For example, consider that the data item indicates the preferences of a subject user (e.g., the user to which the data payload pertains) to go to a particular coffee shop in a specific zip code. Now, consider that the subject user no long lives near that zip code. The change in location information may be based on server device 102 receiving location information from a computing device of the subject user—assuming the subject user grants such location access. Thus, if the current location of the subject user is within an X miles radius from the zip code and/or has not been within that radius within the past month, the data item may become less valuable. Accordingly, value updating component 114 may lower the value of the data item by a certain amount or percentage amount.

In another example, server device 102 may receive information (e.g., via API 120) that the subject user is incapacitated or deceased. In such a scenario, value updating component 114 may set the value of all data items associated with the subject user to 0 (or some other nominally low value).

Access rights component 112 may be configured to update a data item and/or data store 130 to indicate which users have access to the data item. For example, as discussed more in FIG. 2 below, a data item may include a token and the token include a list of identifiers corresponding to the users that have access to the data item. Access rights component 112 may update the token to include or remove user identifications. An identification may be added based on a user purchasing access to the data item. If a user has been granted access to a data item, key transmission component 126 may transmit a decryption key for the data payload to the purchasing user. In various examples, access to a data item is limited. For example, a data item may only be accessed for a certain duration of time. Thus, once the time period has lapsed, the token may be updated to remove access.

Figure 2:
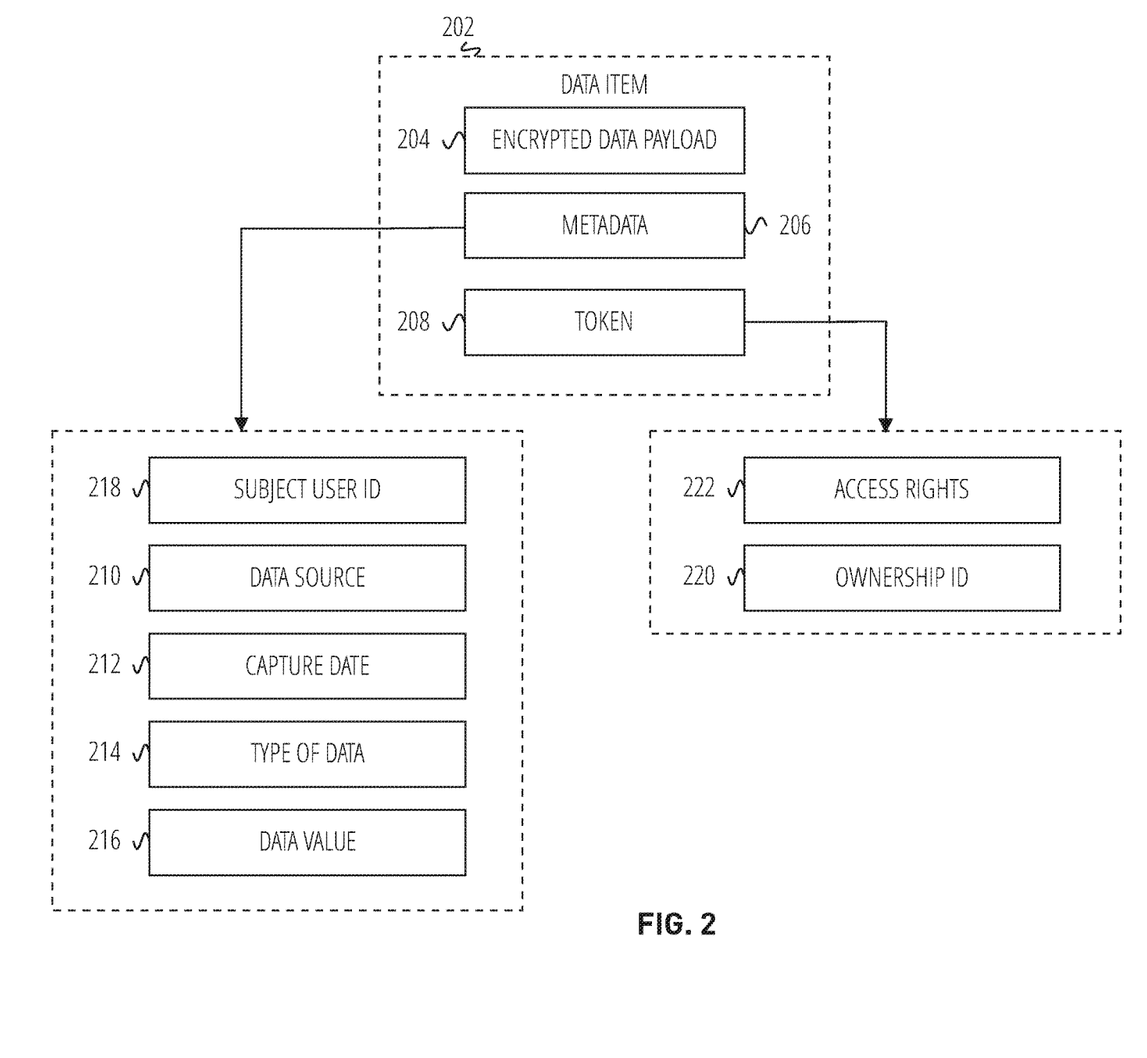
FIG. 2 is a diagram of a structure of a data item, according to various examples.

FIG. 2 is a diagram of a structure of a data item, according to various examples. The diagram comprises a data item 202, an encrypted data payload 204, a metadata 206, and a token 208. Metadata 206 may include a subject user ID 218, a data source 210, a capture date 212, a type of data 214, and a data value 216. Token 208 is illustrated as including an ownership ID 220 and access rights 222.

The data payload may represent the underlying piece of information such as the subject user may visit a coffee shop five times a week. In order to protect access to the payload it may be encrypted. Any suitable encryption technique (e.g., e.g., RSA, DES, Blowfish, AES, etc.) may be used to encrypt the payload. The data payload may be formatted in a number of ways. For example, there may be a standardized schema (e.g., using XML, JSON) for different types of data such that a "user preferences" type of data may include a data field for user preference type (e.g., music) and a genre data field. As another example, a standardized schema may be used for location data with fields for longitude, latitude coordinates or name of a retail location, etc., and frequency of visits to that location. In some examples, the data payload is a media file (e.g., a binary file such as a video or music file) as opposed to a text-formatted file as discussed in the examples above.

Metadata 206 may include one or more pieces of data (e.g., formatted according to an XML or JSON schema) related to the data payload. As illustrated in FIG. 2 there are five fields, but more or fewer fields may be used without departing from the scope of this disclosure. Some or all of the fields may be searchable using search interface component 116. For example, a potential searcher may search for a specific type of data 214 and capture date 212.

Subject user ID 218 may correspond to an identifier of a user as stored in user profiles 128. Furthermore, subject user ID 218 may represent the user about which the data payload concerns—in contrast to an owner of the data item (e.g., ownership ID 220). In various examples, the owner and the subject user may be the same user.

The identification may not be explicitly tied to a person's name to provide at least one level of anonymity to the subject user. For example, server device 102 may store a mapping between a person's name and the identification used in data item 202. Thus, even if a purchaser has access to the encrypted data payload 204, they might not know the name of the person directly.

In various examples, data source 210 represents the source of the data payload with respect to the data payload. For example, a data source may be a computing device associated with the subject user. For example, an application may access sensors (e.g., GPS) on the computing device that may track movements of the subject user-assuming the subject user has granted access sensor access to the application. In other examples, a data source may be a computing device external to the user such as user telemetries captured on a web server. In another example, the data source may be a data aggregator (e.g., a third-party) that bundles many pieces of data together such as user preferences for a number of users. In various examples, capture date 212 identifies the period of time (e.g., date, time, etc.) of when the data payload was originally captured—as opposed to when data source 210 received the data.

Data source 210 may be encapsulated in a number of ways. For example, there may be different identifiers associated with the different sources. In various examples, data source 210 may be encoded according to the type of data source—e.g., subject user provided data is '1', application on a subject user's device is '2', and aggregator is a '3.' In another example, each entity that may provide data may have an identifier and is used as data source 210.

Type of data 214 may identify the type of data of the data payload. Types of data may include, but are not limited to, location pattern data (e.g., places a user visits and frequency of those visits), user preferences (e.g., movies, music), or media files, personal information (e.g., address, etc.). Data value 216 may be a quantitative or qualitative value for the data payload. The value may be calculated in a number of ways as discussed above with respect to value updating component 114.

Access rights 222 may identify which entities have access to the data payload and any restrictions or time limits for the access. In various examples, the token is encrypted such that even if an entity has access to encrypted data payload 204, they will not be able to see or edit the token. Access rights 222 may include a list of entities by identifiers (e.g., as stored in user profiles 128) for those entities that currently have access to the data item. An entry in the list may also include limitations on the access such as a time period after which access expires.

Periodically (e.g., daily), server device 102 may update access rights 222. During an update, entries from the list may be removed if a time period for access has lapsed. In other examples, access rights 222 may be updated in response to an event such as an owner granting or revoking access to the data item.

Ownership ID 220 may identify a list of one or more owners of the data item with respect to encrypted data payload 204. As with access rights 222, the identifier may correspond to an identifier as stored in user profiles 128. Ownership ID 220 may also include an indication of a pro rata share of ownership when there are multiple owners. For example, one owner may own a 50% share of the data item, a second owner 30%, and a third owner 20%.

Additionally, each owner may have an owner inheritance plan. An owner inheritance plan may indicate what happens should a person pass away or somehow become legally incapacitated such that assets of the owner may pass to another. An owner may log in to server device 102 to edit their owner inheritance plan as stored in user profiles 128. For example, server device 102 may transmit a user interface (e.g., a web application) that presents input elements to select one or more of the data items that are owned the user. The interface may also present an input box to enter an identifier(s) for the next-in-line owners should the current owner die (or other specified event) for the selected data items. To bulk edit data items, the owner may use search interface component 116 to find specific data items that meet the search criteria (e.g., type, capture date, etc.). In some examples, the owner may enter in different percentages for subsequent owners (e.g., split the current ownership).

Figure 3:
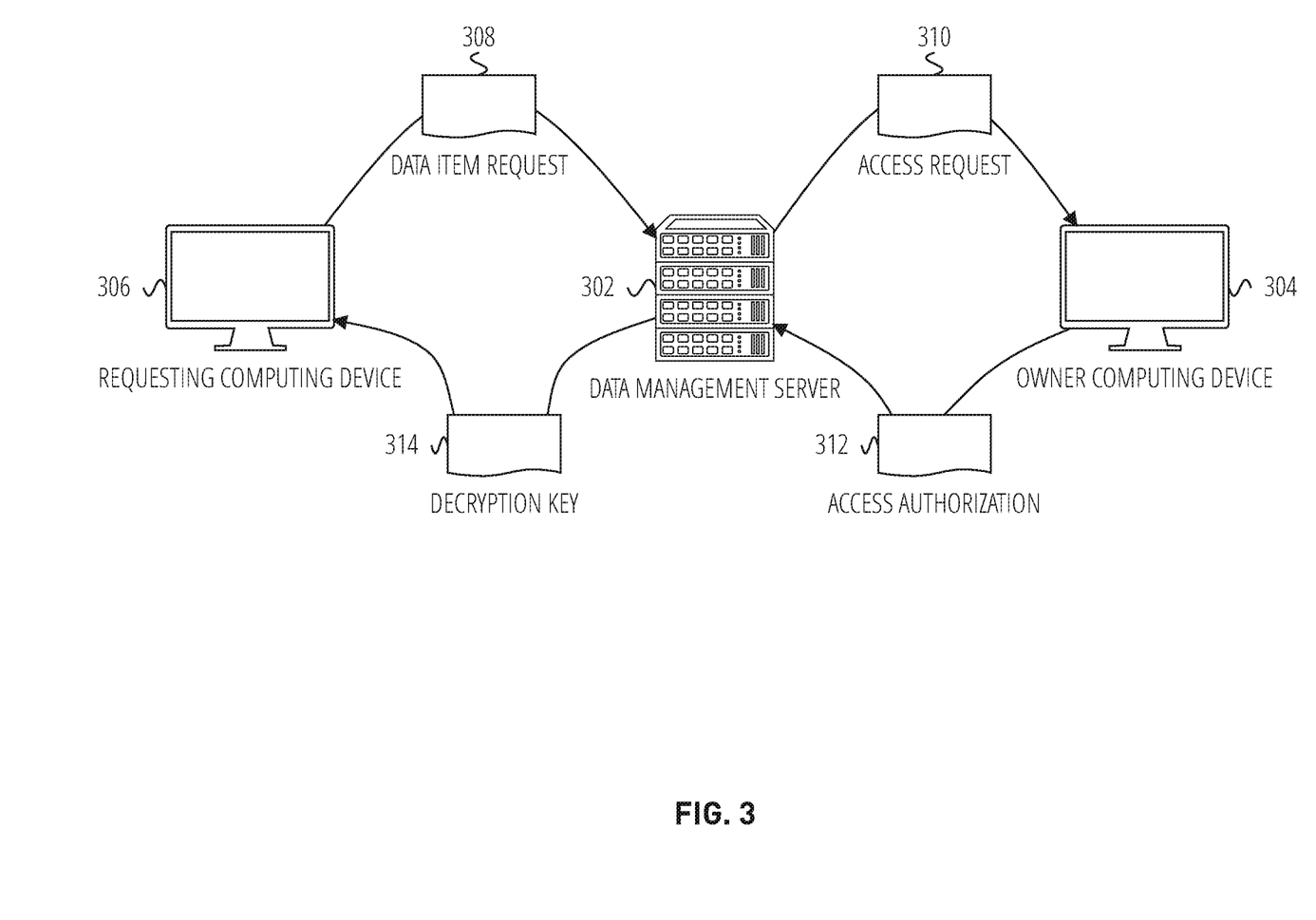
FIG. 3 is a diagram of a data flow for accessing an encrypted data payload, according to various examples.

FIG. 3 is a diagram illustrating a data flow for accessing an encrypted data payload, according to various examples. FIG. 3 includes a data management server 302, an owner computing device 304, a requesting computing device 306, a data item request 308, an access request 310, an access authorization 312, and a decryption key 314. In various examples, data management server 302 may include one or more of the elements of server device 102 as discussed above with respect to FIG. 1.

As discussed above, users that interact with server device 102 (or data management server 302) may take on different roles depending on the actions they are trying to take. For illustration purposes, User A will be considered a user that wishes to buy access to a data item from User B, the owner user. Accordingly, requesting computing device 306 may be a device used by User A, and owner computing device 304 may be a device used by User B.

Initially, User A may navigate to a website managed by data management server 302 using a web browser executing on requesting computing device 306. In response, a login user interface may be presented on a display device of requesting computing device 306. User A may enter in their credentials into the login user interface after which, upon data management server 302 validating the User A via user management component 122, an action user interface may be presented.

The action user interface may present a number of user interface elements related to the different roles a user may have. For example, there may be buttons for: buying access to a data item, managing existing data items, updating their user profile, managing their owner inheritance plan, etc. In some examples clicking one of these buttons takes the user to another interface specific to the clicked button. In some examples, action user interface is segmented for each type of action the user may perform (e.g., buy, search, etc.) without needing to go to another user interface. Different arrangement and types of user interface elements may be used without departing from the scope of this disclosure.

When User A wishes to buy access to a data item, the user may activate (e.g., click) a "buy access" user interface element. Data management server 302 may then present a buying user interface. The buying user interface may include a search interface (e.g., as provided by search interface component 116) that includes search options that may include one or more of (but are not limited to) data item type, data value, data item capture date, data item capture location, and demographics of the subject user of the data item.

After receiving values from User A in the search options, search interface component 116 may query data store 130 for data items that match the entered options. User A may select (e.g., using a checkbox next to each item, hitting a select all button, etc.) one or more of the data items to purchase. Upon selection, data item request 308 may be transmitted to data management server 302. Data item request 308 may include the identifiers of the data items selected by User A. In some examples, data item request 308 is formatted as an API call as defined by API 120.

Data management server 302 may parse the tokens for each of the data items identified in data item request 308 for ownership information of the data item. For each owner identified, data management server 302 may transmit access request 310 to a computing device associated with the respective owner (e.g., owner computing device 304). Owner computing device 304 may be identified in the user profile of the owner in some instances. In some examples, a push notification may be transmitted to owner computing device 304 using a phone number of the owner.

Access request 310 may identify the requesting user (e.g., User A) by name (e.g., company name) and the data item(s) for which access is being requested. In some examples, access request 310 may include a link (e.g., hyperlink) which, when clicked by the owner user, takes the owner to a website that presents the data items and requesting user. User B may then authorize (e.g., by clicking an authorization UI element) access to the data to User A. Consequently, owner computing device 304 may transmit access authorization 312 (e.g., via an API) back to data management server 302. If User B denies the authorization, a message may be transmitted to User A to that effect. In some examples, a user may elect to have default access authorization for some or all of the data items. A user may edit the defaults using user management component 122.

Upon receiving access authorization 312, data management server 302 may retrieve the decryption keys (e.g., decryption key 314) for the data items from data store 130 and transmit them to requesting computing device 306 using key transmission component 126. In some examples, to further enhance security, an additional request may be needed each time User A wishes to decrypt the encrypted data item payload. For example, if an authorization scheme such as OAuth is used, the decryption key may only be valid under certain conditions. Accordingly, User A may need to transmit the decryption key back to data management server 302 each time the payload is decrypted to ensure that User A still has access to the item. Data management server 302 may also update the access rights portion of the data item (e.g., access rights 222) to identify User A as having access to the data item and any conditions of such access.

Data management server 302 may further facilitate payment from User A to User B according to the value of the data item. If there are multiple owners, payment may be made according to the ownership percentages (e.g., as identified in token 208). Any suitable payment mechanism (e.g., auction clearing house, wire transfers, credit cards, etc) may be used without departing from the scope of this disclosure. The accounts used for payment may be identified in user profiles 128

In some instances, data management server 302 is configured as an auction system for data items. Thus, after User A selects a data item, they may make enter in a bid for the data item. Assuming, at the end of the action time (as set by User B or data management server 302) User A has won the auction the remaining data flow of requesting access, etc., depicted in FIG. 3 may remain the same. In some examples, winning the auction obviates the need for an explicit authorization request to User B.

Figure 4:
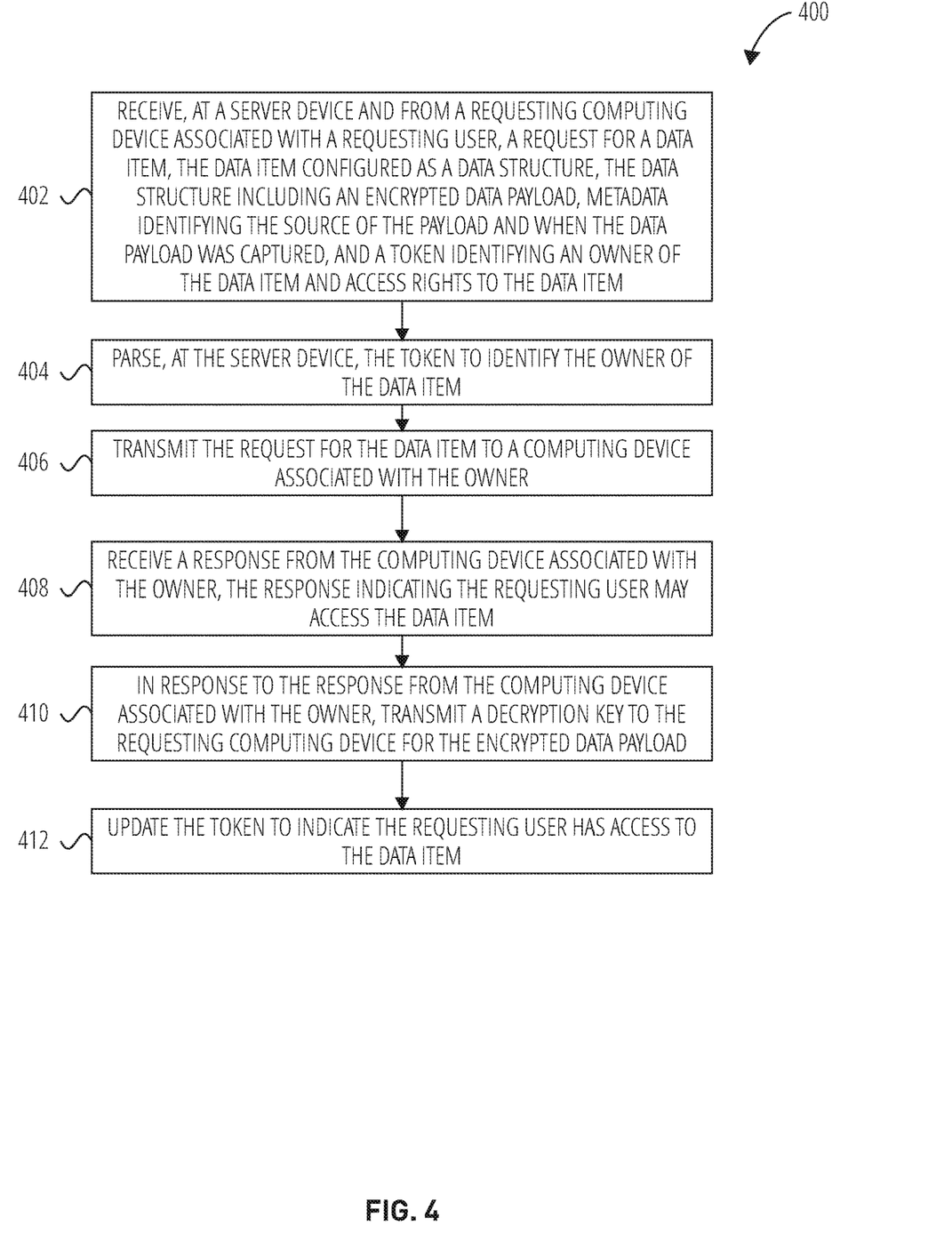
FIG. 4 is a flowchart illustrating a method to facilitate access to a data item, according to various examples.

FIG. 4 is a flowchart illustrating a method to facilitate access to a data item, according to various examples. The method is represented as a set of blocks that describe operations 402-412 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In block 402, a server device receives, from a requesting computing device associated with a requesting user, a request for a data item. The data item may be configured as a data structure, the data structure including an encrypted data payload, metadata that identifies the source of the payload and when the data payload was captured, and a token that identifies an owner of the data item and access rights to the data item. In an example, the data structure is configured like data item 202. In various examples, the server device is server device 102 or data management server 302.

In various examples, the routine 400 may further including presenting a user interface. The user interface may include a search input user interface element (e.g., an input box, filters, etc.) configured to receive a search query. The request for the data item may be based on input received into the search input user interface element. For example, a user may search for data items types concerning user shopping habits or user music preferences.

In various examples, the data structure further includes a value (e.g., a dollar amount) for the data item and wherein the metadata includes a subject user of the encrypted data payload. The metadata may further identify a captured location of the subject user when the time data payload was captured. For example, the data item may indicate the subject user by a user identifier and the time may be Aug. 1, 2020 at 8:00 PM while at a particular address.

Routine 400 may further include receiving information from a computing device indicating a current location of the subject user. The server device may then update the value as stored in the data item based on a distance between the current location and the captured location. Various examples of value updating are discussed in more detail above with respect to value updating component 114.

In block 404, routine 400 continues and parses, at the server device, the token to identify the owner of the data item. For example, the ownership ID 220 field in token 208 may be read by the server device to identify one or more owners of the data item.

In block 406, routine 400 continues and the server device transmits the request for the data item to a computing device associated with the owner(s). For example, the server device may access a user profile from user profiles 128 and retrieve communication methods for the owners. The communications methods may include an email address or phone number to transmit a push notification to. The request may include a link to a webpage at which the owner may grant or deny the access request.

In block 408, the server device may receive a response from the computing device associated with the owner. The response may indicate the requesting user may access the data item. In response to the affirmative response from the computing device associated with the owner, at block 410 a decryption key may be transmitted to the requesting computing device for the encrypted data payload.

In block 412, routine 400 continues and the server device may update the token to indicate the requesting user has access to the data item. Further descriptions of updating the token are discussed above with respect to access rights component 112.

Routine 400 may further include receiving information, at the server device, of a life event of the subject user. For example, the server device may subscribe to third-party services via API 120 that identify or track life events (e.g., marriages, deaths, etc.) associated with users that have granted access to such information. The server device may update the value for the data item based on the life event. For example, if the life event was a death of the subject user then the value may be set to zero.

Routine 400 may further include receiving information, at the server device, of a life event of an owner user. In response to the life event (e.g., a death), an owner inheritance plan may be accessed from a database for the data item. The owner inheritance plan may indicate ownership identifiers of new owners should the current owner pass away. The token may then be updated with a new owner(s) based on the owner inheritance plan.

In various examples, a user interface may be presented to an owner to create/update an owner inheritance plan or update the current ownership should the owner wish to transfer ownership. For example, a user interface may include an input user interface element configured to receive a plurality of user identifiers and respective quantitative values for each user identifier. Based on the received values, the token may be updated to indicate ownership interests in the data item corresponding to the plurality of user identifiers and respective quantitative values.

Figure 5:
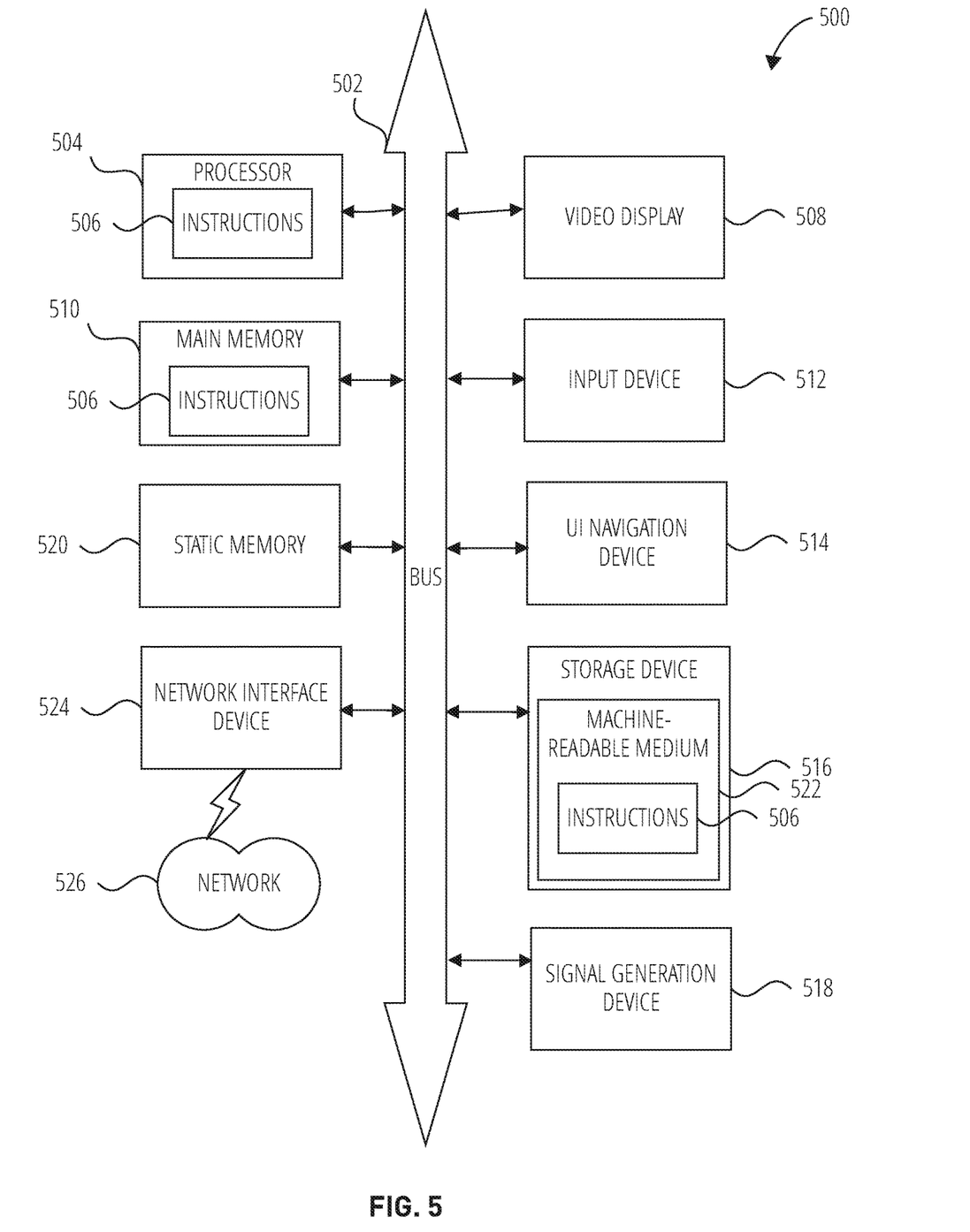
FIG. 5 is a block diagram illustrating a machine in the example form of computer system 500, within which a set or sequence of instructions may be executed to cause the machine to perform any one of the methodologies discussed herein, according to various examples.

FIG. 5 is a block diagram illustrating a machine in the example form of computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 504 (e.g., a central processing unit (CPU), a graphics processing unit (GPU) or both, processor cores, compute nodes, etc.), a main memory 510 and a static memory 520, which communicate with each other via a bus 502. The computer system 500 may further include a video display 508, an input device 512 (e.g., a keyboard), and a UI navigation device 514 (e.g., a mouse). In one embodiment, the video display 508, input device 512, and UI navigation device 514 are incorporated into a single device housing such as a touch screen display. The computer system 500 may additionally include a storage device 516 (e.g., a drive unit), a signal generation device 518 (e.g., a speaker), a network interface device 524 for communication over network 526, and one or more sensors (not shown), such as a global positioning system (GPS) sensor, compass, accelerometer, or other sensors.

The storage device 516 includes a machine-readable medium 522 on which is stored one or more sets of data structures and instructions 506 (e.g., software) embodying or utilized by any one or more of the methodologies or functions described herein. The instructions 506 may also reside, completely or at least partially, within the main memory 510, static memory 520, and/or within the processor 504 during execution thereof by the computer system 100, with the main memory 510, static memory 520, and the processor 504 also constituting machine-readable media.

While the machine-readable medium 522 is illustrated in an example embodiment to be a single medium, the term "machine-readable medium" may include a single medium or multiple media (e.g., a centralized or distributed Database, and/or associated caches and servers) that store the one or more instructions 506. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 522 that excluded transitory signals.

The instructions 506 may further be transmitted or received over a communications Network 126 using a transmission medium via the network interface device 524 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A, 5G, or WiMAX networks). The term "transmission medium" shall be taken to include any intangible medium that is capable of storing, encoding, or carrying instructions for execution by the machine, and includes digital or analog communications signals or other intangible medium to facilitate communication of such software The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein

What is claimed is:

1. A method comprising:
receiving, at a server device and from a requesting computing device associated with a requesting user, a request for a data item, the data item configured as a data structure, the data structure including:
an encrypted data payload;
metadata identifying a source of the payload and when the data payload was captured; and
a token identifying an owner of the data item and access rights to the data item;
parsing, at the server device, the token to identify the owner of the data item;
transmitting the request for the data item to a computing device associated with the owner;
receiving a response from the computing device associated with the owner, the response indicating the requesting user may access the data item;
in response to the response from the computing device associated with the owner:
transmitting a decryption key to the requesting computing device for the encrypted data payload;
updating the token to indicate the requesting user has access to the data item;

receiving information, at the server device, of a life event of an owner user;

in response to the life event, accessing an owner inheritance plan from a database for the data item; and updating the token with a new owner based on the owner inheritance plan.

2. The method of claim 1, wherein the data structure further includes a value for the data item and wherein the metadata includes a subject user of the encrypted data payload.

3. The method of claim 2, wherein the metadata further identifies a captured location of the subject user at a time the data payload was captured.

4. The method of claim 3, further comprising:
receiving information from a computing device indicating a current location of the subject user; and
updating, by the server device, the value based on a distance between the current location and the captured location.

5. The method of claim 2, further comprising:
receiving information, at the server device, of a life event of the subject user; and
updating, by the server device, the value based on the life event.

6. The method of claim 1, presenting a user interface to the owner, the user interface including a user interface element to identify an owner inheritance plan for the data item.

7. The method of claim 1, further comprising:
presenting a user interface, the user interface including a search input user interface element configured to receive a search query; and
wherein the request for the data item is based on input received into the search input user interface element.

8. The method of claim 1, further comprising:
presenting a user interface, the user interface including an input user interface element configured to receive a plurality of user identifiers and respective quantitative values for each user identifier; and
updating the token to indicate ownership interests in the data item corresponding to the plurality of user identifiers and respective quantitative values.

9. A non-transitory computer-readable storage device comprising instructions, which when executed by at least one processor, configure the at least one processor to perform operations comprising:
receiving, at a server device and from a requesting computing device associated with a requesting user, a request for a data item, the data item configured as a data structure, the data structure including:
an encrypted data payload;
metadata identifying a source of the payload and when the data payload was captured; and
a token identifying an owner of the data item and access rights to the data item;
parsing, at the server device, the token to identify the owner of the data item;
transmitting the request for the data item to a computing device associated with the owner;
receiving a response from the computing device associated with the owner, the response indicating the requesting user may access the data item;
in response to the response from the computing device associated with the owner:
transmitting a decryption key to the requesting computing device for the encrypted data payload;

updating the token to indicate the requesting user has access to the data item;

receiving information, at the server device, of a life event of an owner user;

in response to the life event, accessing an owner inheritance plan from a database for the data item; and updating the token with a new owner based on the owner inheritance plan.

10. The computer-readable storage device of claim 9, wherein the data structure further includes a value for the data item and wherein the metadata includes a subject user of the encrypted data payload.

11. The computer-readable storage device of claim 10, wherein the metadata further identifies a captured location of the subject user at a time the data payload was captured.

12. The computer-readable storage device of claim 11, wherein the operations further include:
receiving information from a computing device indicating a current location of the subject user; and
updating, by the server device, the value based on a distance between the current location and the captured location.

13. The computer-readable storage device of claim 10, wherein the operations further include:
receiving information, at the server device, of a life event of the subject user; and
updating, by the server device, the value based on the life event.

14. The computer-readable storage device of claim 9, presenting a user interface to the owner, the user interface including a user interface element to identify an owner inheritance plan for the data item.

15. The computer-readable storage device of claim 9, wherein the operations further include:
presenting a user interface, the user interface including a search input user interface element configured to receive a search query; and
wherein the request for the data item is based on input received into the search input user interface element.

16. The computer-readable storage device of claim 9, wherein the operations further include:
presenting a user interface, the user interface including an input user interface element configured to receive a plurality of user identifiers and respective quantitative values for each user identifier; and
updating the token to indicate ownership interests in the data item corresponding to the plurality of user identifiers and respective quantitative values.

17. A system comprising:
at least one processor; and
a storage device comprising instructions, which when executed by the at least one processor, configure to the at least one processor to perform operations comprising:
receiving, at a server device and from a requesting computing device associated with a requesting user, a request for a data item, the data item configured as a data structure, the data structure including:
an encrypted data payload;
metadata identifying a source of the payload and when the data payload was captured; and
a token identifying an owner of the data item and access rights to the data item;
parsing, at the server device, the token to identify the owner of the data item;
transmitting the request for the data item to a computing device associated with the owner;

receiving a response from the computing device associated with the owner, the response indicating the requesting user may access the data item;
in response to the response from the computing device associated with the owner:
transmitting a decryption key to the requesting computing device for the encrypted data payload;
updating the token to indicate the requesting user has access to the data item;
receiving information, at the server device, of a life event of an owner user;
in response to the life event, accessing an owner inheritance plan from a database for the data item; and
updating the token with a new owner based on the owner inheritance plan.

18. The system of claim 17, wherein the data structure further includes a value for the data item and wherein the metadata includes a subject user of the encrypted data payload.

* * * * *